US008771550B2

(12) United States Patent
Steele et al.

(10) Patent No.: US 8,771,550 B2
(45) Date of Patent: Jul. 8, 2014

(54) PARTIAL OXIDATION FEED SYSTEM AND METHOD

(75) Inventors: Raymond Douglas Steele, Cypress, TX (US); Thomas Frederick Leininger, Chino Hills, CA (US); Shiguang Li, ShangHai (CN)

(73) Assignee: General Electric Company, Schenectady, NY (US)

( * ) Notice: Subject to any disclaimer, the term of this patent is extended or adjusted under 35 U.S.C. 154(b) by 34 days.

(21) Appl. No.: 13/512,018

(22) PCT Filed: Apr. 23, 2012

(86) PCT No.: PCT/CN2012/074505
§ 371 (c)(1),
(2), (4) Date: May 24, 2012

(87) PCT Pub. No.: WO2013/159270
PCT Pub. Date: Oct. 31, 2013

(65) Prior Publication Data
US 2013/0277615 A1    Oct. 24, 2013

(51) Int. Cl.
*C01B 3/32*   (2006.01)
*B01J 19/00*  (2006.01)
(52) U.S. Cl.
USPC ............ 252/373; 422/107; 422/129; 422/224
(58) Field of Classification Search
None
See application file for complete search history.

(56) References Cited

U.S. PATENT DOCUMENTS

| 4,322,389 | A  | * | 3/1982 | Schmid ............... 422/187 |
| 2009/0178338 | A1 | * | 7/2009 | Leininger et al. ...... 48/86 R |
| 2011/0232191 | A1 | * | 9/2011 | Diebold et al. ........ 48/87 |

FOREIGN PATENT DOCUMENTS

| CN | 86104452 A2 | 4/1987 |
| CN | 101525118 A | 9/2009 |
| CN | 101952658 A | 1/2011 |
| EP | 2386621 A2 | 11/2011 |

OTHER PUBLICATIONS

Carboxymethyl Cellulose; Wikipedia Article; Jul. 11, 2011; pp. 1-2.
PCT Search Report and Written Opinion dated Jan. 31, 2013 from corresponding Application No. PCT/CN2012/074505.

* cited by examiner

*Primary Examiner* — Melvin C Mayes
*Assistant Examiner* — Douglas Call
(74) *Attorney, Agent, or Firm* — Fletcher Yoder P.C.

(57) ABSTRACT

A system includes a slag additive slurry feed system configured to combine a slurrying agent, a mineral slag additive, and a liquid slurrying medium to generate a stabilized mineral slurry. The slurrying agent is configured to increase a viscosity of the stabilized mineral slurry. The system also includes a partial oxidation system configured to receive the stabilized mineral slurry, a feedstock, and oxygen into a gasifier reaction chamber. The partial oxidation system is configured to partially oxidize the feedstock to produce a gaseous product and a solid product.

21 Claims, 3 Drawing Sheets

PARTIAL OXIDATION FEED SYSTEM AND METHOD

CROSS-REFERENCE TO RELATED APPLICATION

This application claims priority to and benefit of PCT Patent Application No. PCT/CN2012/074505, entitled "PARTIAL OXIDATION FEED SYSTEM AND METHOD", filed Apr. 23, 2012, which is herein incorporated by reference in its entirety.

BACKGROUND OF THE INVENTION

The subject matter disclosed herein relates to partial oxidation feed systems and, more particularly, to slag additive slurry feed systems for partial oxidation feed systems.

Partial oxidation systems may partially oxidize carbon-containing compounds in an oxygen-containing environment to generate various products. For example, gasifiers may convert carbonaceous materials into a mixture of carbon monoxide and hydrogen, referred to as synthesis gas or syngas. An integrated gasification combined cycle (IGCC) power plant includes one or more gasifiers that react a carbonaceous feedstock at a high temperature with oxygen and/or steam to produce syngas. In the case of an ash-containing carbonaceous feedstock, the resulting syngas may include less desirable components, such as molten ash or slag, that may leave the gasifier reaction chamber along with the syngas that is produced. Accordingly, the syngas and slag produced in the gasifier reaction chamber may be directed into the gasifier quench chamber where the syngas and slag may be contacted directly with quench water in order to cool the syngas to the saturation temperature of the syngas, to solidify the molten slag and to remove the solidified slag from the syngas. Slag with a viscosity outside of a certain range may negatively affect components of the gasifier and/or may be difficult to remove from the gasifier.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a slag additive slurry feed system configured to combine a slurrying agent, a mineral slag additive, and a liquid slurrying medium to generate a stabilized mineral slurry. The slurrying agent is configured to increase a viscosity of the stabilized mineral slurry. The system also includes a partial oxidation system configured to receive the stabilized mineral slurry, a feedstock, and oxygen into a gasifier reaction chamber. The partial oxidation system is configured to partially oxidize the feedstock to produce a gaseous product and a solid product.

In a second embodiment, a system includes a slag additive slurry feed system configured to combine a slurrying agent, a mineral slag additive, and a liquid slurrying medium to generate a stabilized mineral slurry. The slurrying agent is configured to increase a viscosity of the stabilized mineral slurry. The system also includes a gasifier configured to receive the stabilized mineral slurry, a feedstock, and oxygen into a gasification chamber. The gasifier is configured to gasify the feedstock to produce a syngas and a slag. The system also includes a slag additive slurry feed control system configured to receive input indicative of a target slag characteristic. The slag additive slurry feed control system is configured to control the slag additive slurry feed system to adjust relative proportions of the slurrying agent, the mineral slag additive, and the liquid slurrying medium comprising the stabilized mineral slurry based on the target slag characteristic.

In a third embodiment, a method includes combining a slurrying agent, a mineral slag additive, and a liquid slurrying medium to generate a stabilized mineral slurry using a slag additive slurry feed system. The slurrying agent is configured to increase a viscosity of the stabilized mineral slurry. The method also includes receiving the stabilized mineral slurry, a feedstock, and oxygen into a partial oxidation system, and partially oxidizing the feedstock to produce a gaseous product and a solid product.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
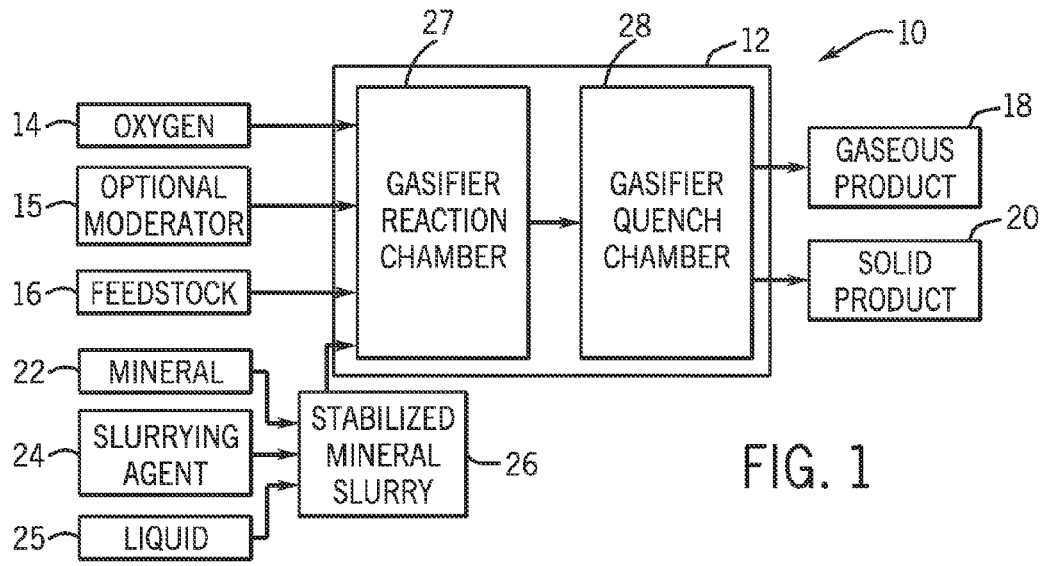
FIG. 1 is a block diagram of an embodiment of a partial oxidation system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include systems directed toward partial oxidation. For example, a partial oxidation system may receive a carbonaceous feedstock (e.g., a slurry of particulate solids, a pneumatically-conveyed stream of particulate solids, a liquid, a gas, or any combination thereof) an oxidant, such as high purity oxygen and, in some cases, additional water into the reaction chamber of a partial oxidation system, where partial oxidation of the feedstock, the oxidant and, in some cases, the additional water, into products occurs. Examples of partial oxidation systems include natural gas partial oxidation units, oil gasifiers, biomass gasifiers, coal gasifiers, petroleum coke gasifiers, and so forth. In certain embodiments, the partial oxidation reaction chamber may generate a gaseous product and a molten ash or slag product. For example, a gasifier may receive the feedstock and oxygen and water to generate a synthetic gas, or syngas, and a slag. In certain embodiments, the gasifier may also receive a stabilized mineral slurry from a slag additive slurry feed system, which may be fed to the gasifier. Specifically, the slag additive slurry feed system may combine a mineral slag additive, a liquid slurrying medium, and a slurrying agent to generate the stabilized mineral slurry, which may be less prone to settling or having the mineral slag additive fall out of the slurry than mineral slurries that do not include the slurrying agent. In certain embodiments, the slurrying agent increases a viscosity of the mineral slurry, which may decrease a settling rate of the slurry, thus making it a stabilized mineral slurry. Thus, settling problems that can interfere with transporting slurries that do not include the slurrying agent to the gasifier may be avoided by using the stabilized mineral slurry. When introduced into the gasifier, the stabilized mineral slurry may have a desirable effect on the slag. For example, using the stabilized mineral slurry may enable a viscosity of the slag to be controlled, which may facilitate removal of the slag from the gasifier reaction chamber or which may minimize harmful interactions between the slag and the refractory lining of the gasifier reaction chamber.

In order to ensure reliable operation of the gasifier, the viscosity of the slag must be maintained within a certain range of viscosities. If the viscosity of the slag is too high, i.e., above the upper end of the range of acceptable viscosities, the slag may be unable to freely pass through the exit passage at the bottom of the gasifier reaction chamber that leads to the quench chamber. In the worst case, highly viscous slag may accumulate in the exit passage, block the flow of syngas and force a shutdown of the gasifier. If the viscosity of the slag is too low, i.e., below the lower end of the range of acceptable viscosities, it may penetrate the pores and seams of the gasifier refractory lining too readily, leading to accelerated degradation of the refractory material which, in turn, may force an early shutdown of the gasifier in order to repair or replace the damaged refractory. In many cases, maintaining the slag viscosity within the acceptable range simply requires that the gasifier operating temperature be adjusted upwards (to decrease the slag viscosity and to reduce the likelihood of blocking the exit passage) or downwards (to increase the slag viscosity and to reduce the penetration of the refractory lining), as appropriate for the given set of conditions. However, in other cases, adjustment of the gasifier operating temperature may not be sufficient to yield a slag viscosity within the acceptable range. For example, there is an upper limit to gasifier operating temperature above which the gasifier refractory operating life is shortened. And there is a lower limit to gasifier operating temperature below which the conversion of carbonaceous feed into syngas is negatively affected. In such cases where the adjustment of gasifier operating temperature alone is insufficient to maintain the slag viscosity within the acceptable range of viscosities, it may be necessary to modify the viscosity of the slag by using a slag additive. A slag additive is a mineral or mixture of minerals which has a composition such that, when it is blended with the ash of the ash-containing feedstock, the resulting molten mixture of the ash from the feedstock and the mineral additive has a viscosity that falls within the range of acceptable viscosities when the gasifier is operated within the range of acceptable gasifier operating temperatures. In cases where the ash-containing feedstock is fed to the gasifier in the form of an aqueous slurry, the slag additive may be mixed with the feedstock during the slurry preparation process. In cases where the feedstock is fed to the gasifier as dry particulate matter using a pneumatic conveying system, the slag additive may also be conveyed to the gasifier as dry particulate mineral matter. In other cases, the slag additive may be mixed with a liquid slurrying medium to make a slurry; and the slag additive slurry may be fed to the gasifier separately from the dry particulate ash-containing feedstock. In such cases, a stable, pumpable slurry of slag additive must be produced in order to ensure steady and reliable feeding of that slurry to the gasifier. A stable slurry is one that does not suffer appreciable separation of the particulate mineral matter from the liquid slurrying medium due to settling. A pumpable slurry is one that has a viscosity that falls within the range of viscosities that can easily be handled by commercially available slurry pumps. In addition, the slag additive slurry must be of sufficient concentration so that excess water is not fed to the gasifier.

Turning now to the drawings, FIG. 1 is a block diagram of an embodiment of a partial oxidation system 10. As shown in FIG. 1, the partial oxidation system 10 may include a partial oxidation system 12, or gasifier, which receives oxygen 14, a feedstock 16 and, in some cases, a moderator 15, such as water, to generate a gaseous product 18 and a solid product 20. The partial oxidation system, or gasifier, 12 may include a gasifier reaction chamber 27 and a gasifier quench chamber 28. Partial oxidation may refer to a chemical reaction in which a fuel or other hydrocarbon is mixed in an exothermic process with oxygen. For example, partial oxidation may occur when a substoichiometric fuel-air mixture is partially combusted. A specific example of partial oxidation is the gasification of a fuel to produce syngas, as described in more detail below. The oxygen 14 may refer to any oxygen-containing stream, such as, but not limited to, pure oxygen, oxygen mixtures, air, air mixtures, and so forth. The feedstock 16 may include any carbonaceous material, such as biofuels and fossil fuels, that can be used to generate energy. The feedstock 16 may be in the form of a solid, liquid, gas, slurry, or any combination thereof. The gaseous product 18 may be combusted or partially oxidized in another system to generate additional energy. The solid product 20 may be removed from the partial oxidation system 10 to be reused or disposed of.

In certain embodiments, a mineral slag additive 22, a slurrying agent 24, and a liquid slurrying medium 25 may be combined to produce a stabilized mineral slurry 26, which may be fed to the gasifier reaction chamber 27. In general, a slurry may refer to a thick suspension of solids in a liquid. In addition, the mineral slag additive 22 may be a naturally occurring solid chemical substance formed through geochemical processes, having a characteristic chemical composition and specific physical properties. Thus, the stabilized mineral slurry 26 may include a suspension of the mineral slag additive 22 in the liquid slurrying medium 25. For example, the stabilized mineral slurry 26 may be a suspension of silicon dioxide, calcium carbonate, iron oxide, or aluminum oxide particles, or combinations thereof (i.e., the mineral slag additive 22) in water (i.e., the liquid slurrying medium 25). In other embodiments, the stabilized mineral slurry 26 may include other mineral compounds suspended in water. As discussed in detail below, the mineral slag additive 22 of the stabilized mineral slurry 26 may be selected to affect properties of the solid product 20. For example, the stabilized mineral slurry 26 may adjust (e.g., increase) a viscosity of the slag within the gasifier reaction chamber 27. In certain embodiments, the mineral slag additive 22, slurring agent 24, and the liquid slurrying medium 25 may be combined in several steps to generate the stabilized mineral slurry 26. For example, the slurrying agent 24 and the liquid slurrying medium 25 may be combined in a first step to produce a mixture and the mineral slag additive 22 may be added to the mixture in a second step.

In certain embodiments, the mineral slag additive 22 of the stabilized mineral slurry 26 may have a tendency to settle or fall out of the stabilized mineral slurry 26 without the use of the slurrying agent 24. In other words, the settling rate, which may be defined as a rate at which particles of solids fall through a liquid, may be high when the mineral slurry 26 does not include the slurrying agent 24. The settling rate may be affected by a variety of factors including, but not limited to, particle size, particle shape, particle density, liquid viscosity, liquid density, and so forth. The high settling rate of the mineral slag additive 22 without the use of the slurrying agent 24 may hinder the transport of the slurry using typical process equipment, such as pumps, pipes, and valves. For example, mineral slag additives 22 that have settled out of the slurry may cause plugging and blockages in process lines. Therefore, it may be difficult to add the slurry to the gasifier reaction chamber 27. In certain embodiments, the slurrying agent 24 is combined with the mineral slag additive 22 and the liquid slurrying medium 25 to generate the stabilized mineral slurry 26, which may have improved physical properties compared to slurries that do not include the slurrying agent 24. For example, the slurrying agent 24 may increase a viscosity of the stabilized mineral slurry 26, which may decrease the settling rate of solids (e.g., mineral slag additive 22) within the stabilized mineral slurry 26. In other embodiments, the slurrying agent 24 may improve other properties of the stabilized mineral slurry 26 that also decrease the settling rate of the stabilized mineral slurry 26. The use of the slurrying agent 24 to decease the settling rate of the stabilized mineral slurry 26 may facilitate transport of the stabilized mineral slurry 26 to the gasifier reaction chamber 27. For example, the stabilized mineral slurry 26 may be less likely to cause plugging, blockages, or other problems associated with slurries that do not include the slurrying agent 24.

As described above, the desired slag additive slurry includes a mineral slag additive 22, a liquid slurrying medium 25, and a slurrying agent 24. The physical and chemical properties of the mineral slag additive 22 are chosen so that the resulting molten mixture of feedstock ash and mineral additive, i.e. the resultant slag, within the gasifier reaction chamber 27 has a viscosity that is within an acceptable range, i.e., a range that minimizes damage to the interior refractory lining of the reaction chamber 27 and a range that ensures reliable slag flow out of the reaction chamber 27 and into the quench chamber 28. For example, a mineral rich in silicon dioxide may be chosen to increase the slag viscosity of a feedstock ash that, by itself, has an unacceptably low viscosity. The mineral may have a concentration of 95%, 90%, 75%, or 50% silicon dioxide. In contrast, a mineral rich in iron oxide or calcium oxide may be chosen to decrease the slag viscosity of a feedstock ash that, by itself, has an unacceptably high viscosity. The mineral may have a concentration of 95%, 90%, 75%, or 50% iron oxide or calcium oxide. Furthermore, the chemical and physical properties and the relative quantities of the mineral slag additive 22, the liquid slurrying medium 25, and the slurrying agent 24 are chosen in order to produce a final, stabilized mineral slurry having a minimal tendency to separate via settling of solids, having a viscosity that is easily handled by commercially available slurry pumping and processing equipment, and of a sufficient concentration so as to avoid feeding excess water to the gasifier.

Figure 2:
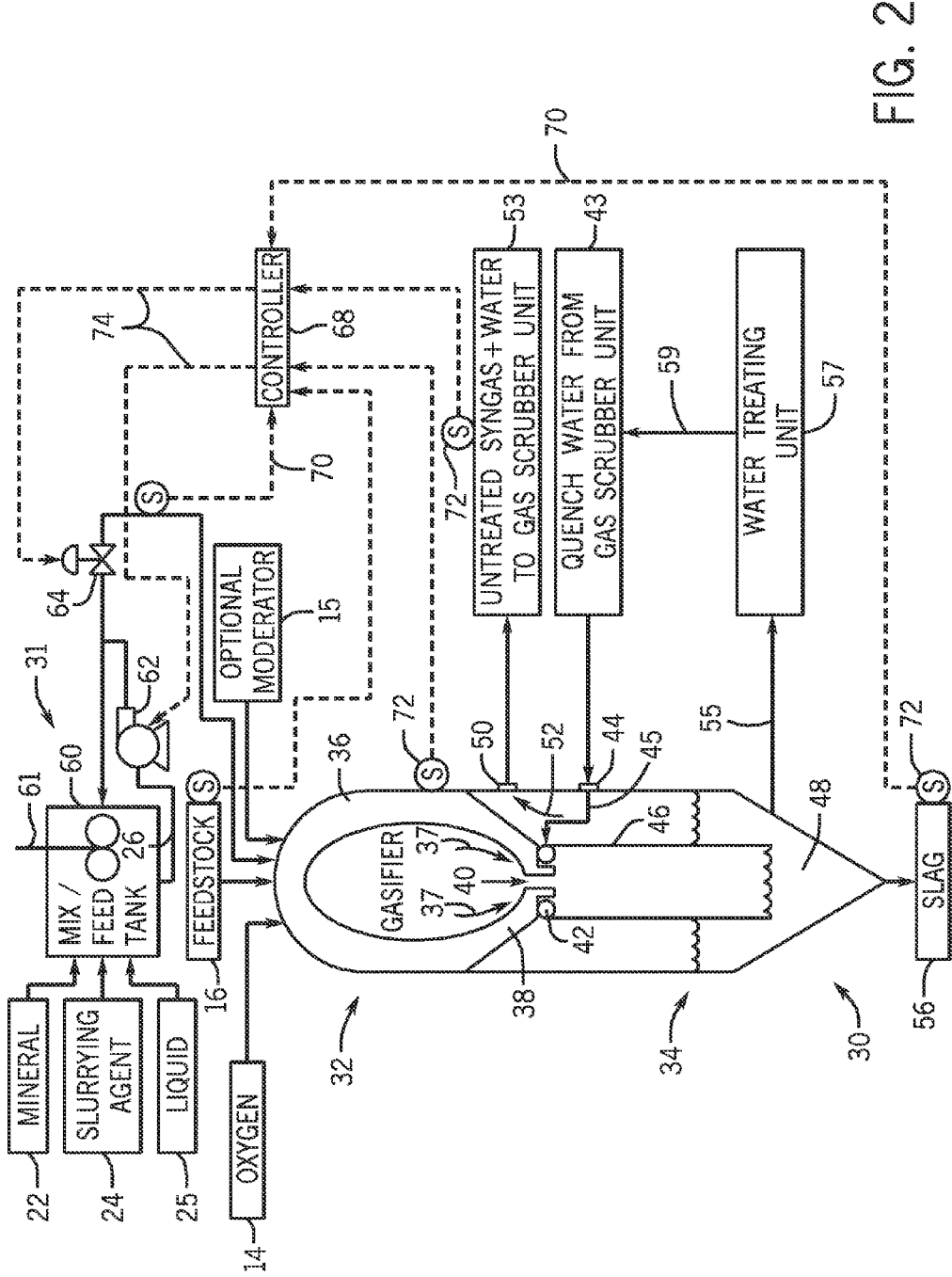
FIG. 2 is a schematic diagram of a gasifier incorporating an embodiment of a slag additive slurry feed system along with a control system for regulating the operation of the slag additive slurry feed system.

FIG. 2 is a schematic diagram of an exemplary embodiment of a gasifier 30, which may include a slag additive slurry feed system 31. The gasifier 30 may be divided into a reaction chamber 32 and a quench chamber 34. In other embodiments, a heat exchanger, such as a syngas cooler, may be disposed between the reaction chamber 32 and the quench chamber 34. A protective barrier 36 may enclose the reaction chamber 32. The protective barrier 36 may act as a physical barrier, a thermal barrier, a chemical barrier, or any combination thereof. Examples of materials that may be used for the protective barrier 36 include, but are not limited to, refractory materials, non-metallic materials, ceramics, and oxides of chromium, aluminum, silicon, magnesium, iron, titanium, zirconium, and calcium. In addition, the materials used for the protective barrier 36 may be in the form of bricks, castable refractory, coatings, or any combination thereof. The feedstock 16, along with oxygen 14 and an optional moderator 15, such as steam or water, may be introduced through one or more inlets into the reaction chamber 32 of the gasifier 30 to be partially oxidized into a raw or untreated synthetic gas, e.g., a combination of carbon monoxide and hydrogen, which may also include slag and other contaminants. In certain embodiments, air or oxygen-enriched air may be used instead of the oxygen 14. The untreated synthesis gas may also be described as untreated gas. The conversion in the gasifier 30 may be accomplished by subjecting the feedstock 16 to steam and oxygen at elevated pressures, e.g., from approximately 20 bar to 100 bar, or to 85 bar, and temperatures, e.g., approximately 1100 degrees C. to 1450 degrees C., depending on the type of gasifier 30 utilized. Under these conditions, and depending upon the composition of the ash in the feedstock 16, the ash may be in the molten state, which is referred to as molten ash, or molten slag 37. In other embodiments, the ash may not be entirely in the molten state. For example, the molten slag 37 may include solid (non-molten) particles suspended in molten slag.

The high-pressure, high-temperature untreated synthetic gas from the reaction chamber 32 may enter the quench chamber 34 through a bottom end 38 (or throat) of the protective barrier 36, as illustrated by arrow 40. In other embodiments, the untreated synthetic gas passes through the syngas cooler before entering the quench chamber 34. In general, the quench chamber 34 may be used to reduce the temperature of the untreated synthetic gas, to disengage the molten slag 37 from the syngas, and to quench and solidify the molten slag 37. In certain embodiments, a quench ring 42 may be located proximate to the bottom end 38 of the protective barrier 36. The quench ring 42 is configured to provide quench water to the quench chamber 34. In certain embodiments, the configuration of the protective barrier 36 may help protect the quench ring 42 from the syngas and molten slag 37. As illustrated, quench water 43 from a gas scrubber unit may be received through a quench water inlet 44 into the quench ring 42 via line 45. In general, the quench water 43 may flow through the quench ring 42 and down the inner surface of a dip tube 46 into a quench chamber sump 48. As such, the quench water 43 may protect the dip tube 46 as the hot, untreated syngas and molten slag 37 passes through the dip tube 46 and enters the pool of water in the quench sump 48. As the untreated syngas passes through the pool of water in the quench sump 48, the molten slag 37 is solidified and disengaged from the syngas, the syngas is cooled and quenched, and the syngas subsequently exits the quench chamber 34 through a syngas outlet 50, as illustrated by arrow 52. In other embodiments, a coaxial draft tube (not shown) may surround the dip tube 46 to create an annular passage through which the untreated syngas may rise. The syngas outlet 50 may generally be located separate from and above the quench chamber sump 48 and may be used to transfer the quenched, untreated syngas to the gas scrubber unit for treatment, as indicated by block 53. For example, the gas scrubber unit may remove fine solid particles and other contaminants. The treated syngas from the gas scrubber unit may ultimately be directed to a chemical process or a combustor of a gas turbine engine, for example. Solidified slag may accumulate at the bottom of the quench chamber sump 48 and be removed as a solidified slag product 56 from the gasifier 30 for reuse or disposal. The level of the pool of water in the quench sump 48 is controlled by blowing down an appropriate amount of water via line 55 to a water treating unit 57. The water treating unit 57 removes fine particulates, dissolved gases, and other contaminants from the blow down water and recycles treated water to the gas scrubber unit 53 via line 59.

The slag additive slurry feed system 31 may include several components configured to combine the mineral slag additive 22, the slurrying agent 24, and the liquid slurrying medium 25 to generate the stabilized mineral slurry 26 conveyed to the gasifier 30. In the illustrated embodiment, the slag additive slurry feed system 31 may include a mix/feed tank 60 to receive the mineral slag additive 22, slurrying agent 24, and liquid slurrying medium 25. The tank 60 may include a slurry agitator 61 to mix the mineral slag additive 22, slurrying agent 24, and liquid slurrying medium 25 together. A slurry pump 62 may be used to circulate the stabilized mineral slurry 26 to the tank 60 and/or convey the stabilized mineral slurry 26 from the tank 60 to the gasifier 30. In certain embodiments, a slurry valve 64 may be disposed downstream of the slurry pump 62 to adjust a flow rate of the stabilized mineral slurry 26 flowing to the gasifier 30. The stabilized mineral slurry 26 may be prepared in a variety of ways. For example, the liquid slurrying medium 25 (e.g., water) may be added to the tank 60, followed by the slurrying agent 24, and mixed using the agitator 61 and/or the slurry pump 62 to generate a mixture. Then, the mineral slag additive 22 may be added to the mixture in the tank 60 and mixed to generate the stabilized mineral slurry 26. In other embodiments, the mineral slag additive 22, slurrying agent 24, and liquid slurrying medium 25 may be combined in different ways to produce the stabilized mineral slurry 26. For example, the slag additive slurry feed system 31 may include separate mix and feed (i.e., run) tanks. The mix tank may be used to mix the mineral slag additive 22, slurrying agent 24, and liquid slurrying medium 25 together to produce the stabilized mineral slurry 26, which may then be transferred to the feed tank using the slurry pump 62. A feed tank pump may then be used to transfer the stabilized mineral slurry 26 from the feed tank to the gasifier 30. In another embodiment, the liquid slurrying medium 25 (e.g. water), the slurrying agent 24, and the mineral slag additive 22 may be continuously fed in the correct proportions to a wet grinding mill (not shown), such as a rod mill or a ball mill, where the mineral slag additive 22 may be simultaneously ground to the proper particle size distribution and mixed with the liquid slurrying medium 25 and the slurrying agent 24. The produced slurry may be discharged into a mill discharge tank (not shown) and from there transferred via a pump (not shown) to the mix/feed tank 26 shown in FIG. 2.

As described above, the slurrying agent 24 may be selected to adjust properties of the stabilized mineral slurry 26. Specifically, the slurrying agent 24 may increase a viscosity of the stabilized mineral slurry 26. For example, the slurrying agent 24 may increase the viscosity of the stabilized mineral slurry 26 by greater than approximately 10, 20, 30, 40, or 50 percent, depending on the particular slurrying agent 24 and its concentration. In certain embodiments, the mineral slag additive 22 suspended in the stabilized mineral slurry 26 may be less likely to settle or fall out of the stabilized mineral slurry 26 at higher viscosities. Thus, the settling rate of the stabilized mineral slurry 26 may decrease as the concentration of the slurrying agent 24 in the stabilized mineral slurry 26 increases. A variety of viscosity modifiers or thickeners may be used for the slurrying agent 24. For example, the slurrying agent 24 may be any organic compound, such as an organic viscosity modifier or thickener. Thus, the slurrying agent 24, along with the feedstock 16, may be partially oxidized in the gasifier 30 to produce carbon monoxide, hydrogen, and carbon dioxide. Thus, the partial oxidation of the slurrying agent 24 may provide a small amount of fuel value to the gasifier 30, while having a negligible effect on the untreated syngas. Examples of the slurrying agent 24 that may be used in the gasifier 30 include, but are not limited to, carboxymethyl cellulose (CMC), sucrose, wood pulp, paper pulp, cellulosic materials, long-chain polymers, soluble polymers, and any other polymers capable of colloidal suspension or otherwise suspendable. Such slurrying agents 24 may increase the viscosity of the stabilized mineral slurry 26. In further embodiments, other slurrying agents 24 may be selected that also decrease the settling rate of the stabilized mineral slurry 26.

As discussed above, the mineral slag additive 22 may be selected to affect properties of the slag produced in the gasifier 30. For example, addition of the stabilized mineral slurry 26 to the gasifier 30 may increase the viscosity of the slag. Controlling the viscosity of the slag may be desirable to help prevent operational problems with the gasifier 30. For example, when the viscosity of the slag is low, the slag may seep into pores and seams in the protective barrier 36. Specifically, low viscosity slag may be able to move behind the protective barrier 36, thereby degrading the walls of the gasifier 30 because of contact with the high-temperature slag. Thus, it may be desirable to maintain the viscosity of the slag above a minimum threshold. However, slag with a high viscosity may not be able to flow freely through the gasifier 30 and/or out the quench chamber sump 48. Thus, it may be desirable to maintain the viscosity of the slag below a maximum threshold. By adjusting a flow rate, concentration, or composition of the stabilized mineral slurry 26 in the gasifier 30, the viscosity of the slag may be maintained between the minimum and maximum viscosity thresholds. Examples of the mineral slag additive 22 that may be used in the stabilized mineral slurry 26 include, but are not limited to, silicon dioxide, calcium carbonate, iron oxide, aluminum oxide, and so forth.

In certain embodiments, a slurry controller 68 may be used to control the flow rate of the stabilized mineral slurry 26. Specifically, the controller 68 may receive signals 70 from various sensors 72 disposed throughout the gasifier 30 and the slag additive slurry feed system 31. For example, the sensors 72 may provide information regarding characteristics of the slag, operating conditions within the gasifier 30, the flow rate of the stabilized mineral slurry 26, properties of the feedstock 16, properties of the untreated syngas, and so forth. In one embodiment, a differential pressure sensor 72 may have a high pressure leg connected to a gasifier pressure sensor and a low pressure leg connected to a quench chamber or syngas exit line pressure sensor. If slag begins to plug the throat, the differential pressure may increase above a threshold and send a signal 70 to the controller 68. In another embodiment, an optical sensor 72 may be mounted toward the top of the gasifier 30 to optically monitor the condition of the throat with respect to slag plugging and/or slag erosion and provide a signal 70 that can be used by the controller 68. Based on the information received from the sensors 72, the controller 68 may send signals 74 to the slurry pump 62 and/or the slurry valve 64 to adjust the flow rate of the stabilized mineral slurry 26 flowing to the gasifier 30. In one embodiment, the controller 68 may receive signals 72 indicative of a target viscosity of the slag and send signals 74 to the slag additive slurry feed system 31 to adjust the flow rate of the stabilized mineral slurry 26 based on the target viscosity of the slag. In other embodiments, the controller 68 may be used to adjust the relative amounts of the mineral slag additive 22, slurrying agent 24, and/or liquid slurrying medium 25 in the stabilized mineral slurry 26

Figure 3:
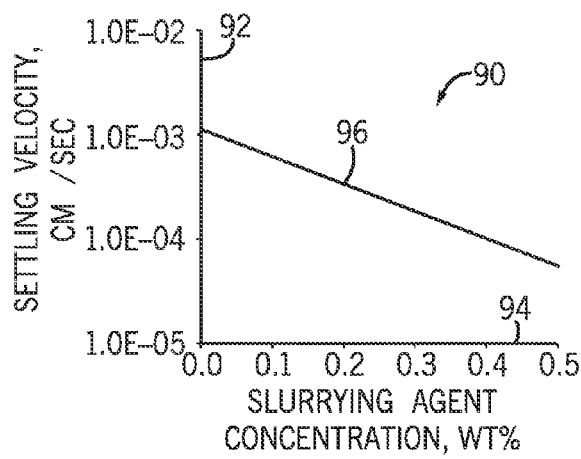
FIG. 3 is a graph of slurry solids settling velocity versus slurrying agent concentration in accordance with an embodiment of the disclosed technique.

FIG. 3 is a graph 90 of slag additive slurry solids settling velocity 92 in units of cm/sec on a y-axis versus slurrying agent concentration 94 in units of weight percent (based on the weight of the dry slag mineral solids or mineral slag additive 22) on an x-axis for a slurry containing 60 wt % mineral solids. As shown in FIG. 3, a line 96 indicates that the settling velocity of the solids in the slag additive slurry decreases as the slurrying agent concentration in the slurry increases. As the mineral slurry settling rate 92 decreases, the amount of the minerals in the stabilized mineral slurry 26 that settle or fall out may also decrease. For example, for slurrying agent concentrations between approximately 0.4 and 0.5 weight percent, the mineral slurry settling rate 92 may be between approximately $1 \times 10^{-4}$ to $5 \times 10^{-5}$ cm/s. At such low settling rates, the amount of minerals that settle out of the stabilized mineral slurry 26 may be small enough not to interfere with the transport of the stabilized mineral slurry 26 to the gasifier 12. In other embodiments, the concentration of the slurrying agent 24 in the stabilized mineral slurry 26 may be between approximately 0.25 to 2, 0.3 to 1.75, or 0.4 to 1.5 percent, depending on the particular materials selected for the stabilized mineral slurry 26. In addition, the range of settling rates may differ from that shown in FIG. 3, depending on the particular materials selected for the stabilized mineral slurry 26. Thus, the settling rate that corresponds to a low settling rate for a particular system may depend on various system-specific factors. However, in general, the low settling rate may determined based on the amount of time it takes for an unacceptable amount of solids to accumulate at the bottom of the equipment or piping during a low-flow or no-flow situation (e.g., a pump shutdown). When flow resumes, the unacceptable amount of solids may not be able to resuspsended and transported with along with the slurry. Thus, if the amount of time for the unacceptable amount of solids exceeds the expected duration of the low-flow or no-flow situation, then the settling rate is high. Conversely, if the amount of time for the unacceptable amount of solids is less than the expected duration of the low-flow or no-flow situation, then the settling rate is low. In practice, a system may have a range of low settling rates that may provide acceptable performance in various different situations and in various parts of the system.

Figure 4:
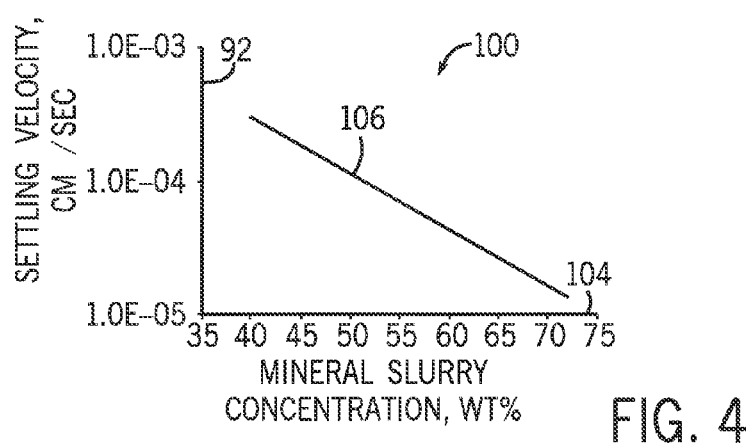
FIG. 4 is a graph of slurry solids settling velocity versus mineral slurry concentration in accordance with an embodiment of the disclosed technique.

FIG. 4 is a graph 100 of slag additive slurry solids settling velocity 92 in units of cm/sec on a y-axis versus mineral solids concentration 104 in units of weight percent on an x-axis for a slurry containing 0.5 wt % slurrying agent, calculated based on the dry weight of the mineral solids. As shown on FIG. 4, a line 106 indicates that the settling velocity of the solids in the slag additive slurry decreases as the mineral slurry concentration increases. For example, for solids concentrations between approximately 60 and 65 wt %, the mineral slurry settling rate 92 may be between approximately $5 \times 10^{-5}$ to $2.7 \times 10^{-5}$ cm/s. At such low settling rates, the amount of minerals that settle out of the stabilized mineral slurry 26 may be small enough not to interfere with the transport of the stabilized mineral slurry 26 to the gasifier 12. In other embodiments, the mineral solids concentration in the stabilized mineral slurry 26 may be between approximately 50 to 75, 55 to 70, or 60 to 65 weight percent, depending on the particular materials selected for the stabilized mineral slurry 26. In addition, the range of settling rates may differ from that shown in FIG. 4, depending on the particular materials selected for the stabilized mineral slurry 26.

Figure 5:
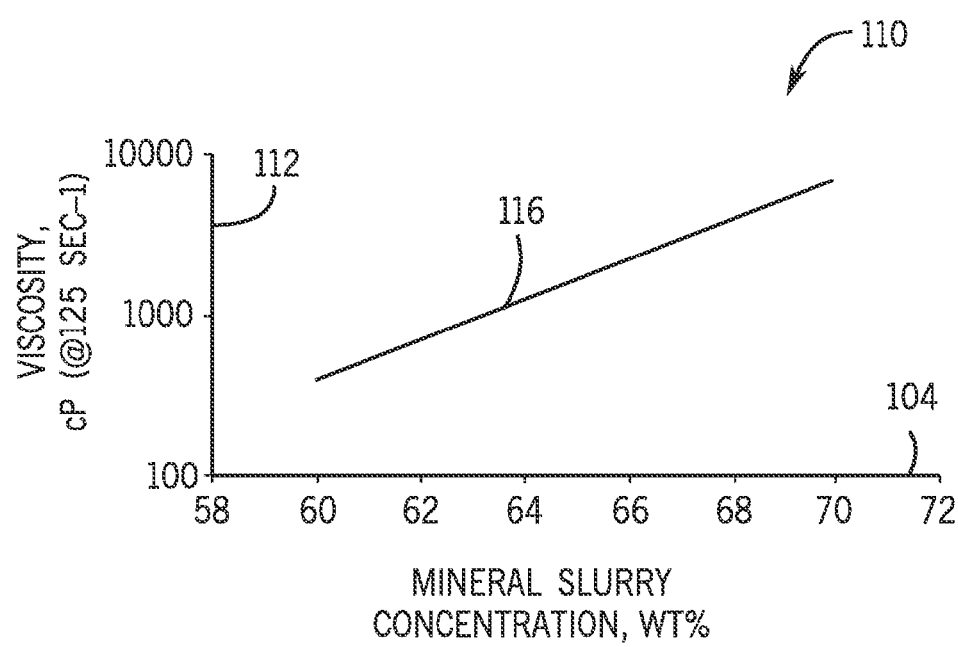
FIG. 5 is a graph of slag additive slurry viscosity versus mineral slurry concentration in accordance with an embodiment of the disclosed technique.

FIG. 5 is a graph 110 of mineral slurry viscosity (measured at a shear rate of 125 $sec^{-1}$) 112 in units of centipoise on a y-axis versus mineral solids concentration 104 in units of weight percent on an x-axis for a slurry containing 0.5 wt % slurrying agent, calculated based on the dry weight of the mineral solids. As shown on FIG. 5, a line 116 indicates that the mineral slurry viscosity 112 increases as the mineral slurry concentration 104 increases. For example, for mineral slurry concentrations 104 between approximately 60 and 63 weight percent, the mineral slurry viscosity 92 may be between approximately 420 to 965 cP. In certain embodiments, the mineral slurry viscosity 92 may be less than approximately 1000 cP. In other embodiments, the concentration of the mineral slag additive 22 in the stabilized mineral slurry 26 may be between approximately 58 to 65, 59 to 64, or 60 to 63 weight percent, depending on the particular materials selected for the stabilized mineral slurry 26. In addition, the viscosity of the stabilized mineral slurry 26 may be between approximately 235 to 1690, 315 to 1275, or 420 to 965 cP, depending on the particular materials selected for the stabilized mineral slurry 26. At such high mineral slurry viscosities, the stabilized mineral slurry 26 may not be susceptible to settling that may cause plugging or blockages in the slag additive slurry feed lines, or problems in the slag additive slurry pumps or control valves. Thus, only a relatively small amount of the slurrying agent 24 may be added to relatively large quantities of mineral slag additive 22 in order to achieve desirable viscosities for the stabilized mineral slurry 26.

In addition to mineral slurry concentration and slurrying agent concentration, the particle size distribution of the mineral solids is also an important parameter in making mineral slurries with the desired properties, that is, slurries that do not suffer appreciable separation due to settling, slurries that have a viscosity that falls within the range of viscosities that can easily be handled by commercially available slurry pump, and slurries that are of sufficient concentration that excess water is not fed to the gasifier. It has been found that a particle size distribution where 100% of the particles pass through a 270 mesh screen (53 microns) and 95% pass through a 400 mesh screen (37 microns) is adequate for making the desired stable slurries. Thus, in one embodiment, the stable mineral additive slurry consists of a 60 weight percent slurry of silica particles in water, with 0.5 weight percent CMC slurrying agent (based on the weight of the dry mineral solids), and having the particle size distribution described above.

As described above, certain embodiments may include a slag additive slurry feed system 31 and a partial oxidation system 10. The slag additive slurry feed system 31 may combine the liquid 25 and the slurrying agent 24 with the mineral slag additive 22 to generate the stabilized mineral slurry 26. In certain embodiments, the slurrying agent 24 increases the viscosity of the stabilized mineral slurry 26. The partial oxidation system 10 receives the stabilized mineral slurry 26, the feedstock 16, and oxygen 14 into the gasifier 12. Inside the gasifier 12, the feedstock 16 is partially oxidized to produce a gaseous product 18 and a molten slag 37 that is quenched and solidified in order to produce a solid slag product 20. By increasing the viscosity of the stabilized mineral slurry 26, the slurrying agent 24 helps prevent mineral slag additives from settling out of the stabilized mineral slurry 26, thereby facilitating transport of the stabilized mineral slurry 26 to the gasifier 12. The stabilized mineral slurry 26 may be used to control the viscosity of the molten slag 37 within the gasifier reaction chamber 27 so as to reduce the likelihood of unwanted penetration of the slag into protective barrier 36 and to ensure reliable passage of the molten slag 37 from the reaction chamber 27 into the quench chamber 28. Ensuring reliable passage of the molten slag 37 into the gasifier quench chamber 28 ensures the reliable removal of solid slag product 20 from the gasifier 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a slag additive slurry feed system configured to combine a slurrying agent, a mineral slag additive, and a liquid slurrying medium to generate a stabilized mineral slurry, wherein the slurrying agent is configured to increase a viscosity of the stabilized mineral slurry, the slag additive slurry feed system comprises a slurry tank having the stabilized mineral slurry, and the slurrying agent comprises at least one of carboxymethyl cellulose, sucrose, long-chain polymers, soluble polymers, or polymers capable of colloidal suspension, or a combination thereof; and
    a partial oxidation system configured to receive the stabilized mineral slurry, a feedstock, and oxygen into a gasifier reaction chamber, wherein the partial oxidation system is configured to partially oxidize the feedstock to produce a gaseous product and a solid product.

2. The system of claim 1, wherein the slurrying agent is configured to decrease a settling rate of solids within the stabilized mineral slurry, wherein the solids comprise minerals.

3. The system of claim 2, wherein the settling rate of the stabilized mineral slurry is between approximately $5 \times 10^{-5}$ to $1 \times 10^{-4}$ cm/s.

4. The system of claim 1, wherein the slurrying agent comprises an organic compound configured to partially oxidize in the gasifier reaction chamber.

5. The system of claim 1, wherein the stabilized mineral slurry is configured to increase a viscosity of a molten slag inside the gasifier reaction chamber.

6. The system of claim 1, wherein the slurrying agent comprises the carboxymethyl cellulose.

7. The system of claim 1, wherein the mineral slag additive comprises at least one of silicon dioxide, calcium carbonate, iron oxide, or aluminum oxide, or a combination thereof.

8. The system of claim 1, wherein a concentration of the slurrying agent in the stabilized mineral slurry is between approximately 0.25 to 2 weight percent, calculated based on the dry weight of the mineral slag additive.

9. The system of claim 1, wherein the partial oxidation system is configured to receive a water moderator into a gasifier reaction chamber.

10. The system of claim 1, wherein the slag additive slurry feed system comprises:
    a slurry agitator configured to mix the slurrying agent, the mineral slag additive, and the liquid slurrying medium together to generate the stabilized mineral slurry;
    a slurry pump configured to mix the stabilized slurry and to transfer the stabilized mineral slurry from the slurry tank to the partial oxidation system; and
    a slurry valve configured to adjust a flow rate of the stabilized mineral slurry.

11. The system of claim 1, wherein a concentration of the mineral slag additive within the stabilized mineral slurry is between approximately 60 to 63 weight percent.

12. The system of claim 1, wherein the viscosity of the stabilized mineral slurry is less than 1000 centipoise.

13. They system of claim 1, wherein a particle size distribution of the mineral slag additive is such that 100% of particles of the mineral slag additive pass through a 270 mesh screen (53 microns) and 95% of the particles of the mineral slag additive pass through a 400 mesh screen (37 microns).

14. A system, comprising:
    a slag additive slurry feed system configured to combine a slurrying agent, a mineral slag additive, and a liquid slurrying medium to generate a stabilized mineral slurry, wherein the slurrying agent is configured to increase a slurry viscosity of the stabilized mineral slurry;
    a gasifier configured to receive the stabilized mineral slurry, a feedstock, and oxygen into a gasification chamber, wherein the gasifier is configured to gasify the feedstock to produce a syngas and a slag;
    a sensor configured to provide a signal related to a slag viscosity of the slag; and
    a slag additive slurry feed control system configured to receive the signal and input indicative of a target slag characteristic, wherein the slag additive slurry feed control system is configured to control the slag additive slurry feed system to adjust relative proportions of the slurrying agent, the mineral slag additive, and the liquid slurrying medium comprising the stabilized mineral slurry based on the signal and the target slag characteristic.

15. The system of claim 14, wherein the slag additive slurry feed system comprises a slurry tank having the stabilized mineral slurry, and the slurrying agent comprises at least one of carboxymethyl cellulose, sucrose, wood pulp, paper pulp, cellulosic materials, long-chain polymers, soluble polymers, or polymers capable of colloidal suspension, or a combination thereof.

16. The system of claim 14, wherein the sensor comprises a differential pressure sensor comprising a high pressure leg coupled to a gasifier pressure sensor and a low pressure leg coupled to a quench chamber pressure sensor or a syngas exit line pressure sensor, wherein the gasifier pressure sensor is coupled to the gasifier and configured to indicate a gasifier pressure, the quench chamber pressure sensor is coupled to a quench chamber of the gasifier and configured to indicate a quench chamber pressure, the syngas exit line pressure sensor is coupled to a syngas exit line of the gasifier and configured to indicate a syngas exit line pressure, and the differential pressure sensor is configured to provide the signal indicative of a differential pressure between the high and low pressure legs.

17. The system of claim 14, wherein the sensor comprises an optical sensor configured to provide the signal indicative of a slag plugging condition of a throat of the gasifier, a slag erosion condition of the throat, or any combination thereof.

18. The system of claim 14, wherein the slag additive slurry feed control system is configured to receive a target signal indicative of a target slag viscosity, and is configured to adjust a flow rate of the stabilized mineral slurry to the gasifier based on the signal and the target signal.

19. A method, comprising:
- combining a slurrying agent and a liquid slurrying medium to generate a mixture in a slurry tank of a slag additive slurry feed system, wherein the slurrying agent comprises at least one of carboxymethyl cellulose, sucrose, long-chain polymers, soluble polymers, or polymers capable of colloidal suspension, or a combination thereof;
- combining the mixture and a mineral slag additive to generate a stabilized mineral slurry using the slag additive slurry feed system, wherein the slurrying agent is configured to increase a viscosity of the stabilized mineral slurry;
- receiving the stabilized mineral slurry, a feedstock, and oxygen into a partial oxidation system; and
- partially oxidizing the feedstock to produce a gaseous product and a solid product.

20. The method of claim 19, wherein the partial oxidation system comprises a gasifier, the gaseous product comprises a syngas, and the solid product comprises a slag.

21. The method of claim 19, comprising partially oxidizing the slurrying agent in a gasifier reaction chamber of the partial oxidation system.

\* \* \* \* \*